United States Patent [19]
Lindner et al.

[11] 4,410,031
[45] Oct. 18, 1983

[54] LATENT HEAT ACCUMULATOR

[75] Inventors: Friedrich Lindner, Stuttgart; Kurt Scheunemann, Lahr, both of Fed. Rep. of Germany

[73] Assignee: Deutsche Forschungs- und Versuchsanstalt für Luft- und Raumfahrt e.V, Bonn, Fed. Rep. of Germany

[21] Appl. No.: 282,936

[22] Filed: Jul. 13, 1981

[30] Foreign Application Priority Data

Jul. 25, 1980 [DE] Fed. Rep. of Germany ....... 3028153

[51] Int. Cl.³ .............................................. F28D 21/00
[52] U.S. Cl. ................................. 165/10; 165/104.17; 165/108; 165/111; 126/436
[58] Field of Search ................... 165/108, 111, 104.17, 165/10; 126/430, 436, 400

[56] References Cited

U.S. PATENT DOCUMENTS

| | | | |
|---|---|---|---|
| 4,086,958 | 5/1978 | Lindner et al. ................. | 165/111 X |
| 4,219,075 | 8/1980 | Laing .............................. | 165/111 X |
| 4,227,567 | 10/1980 | Greene ........................ | 165/104.17 X |
| 4,294,310 | 10/1981 | Reusch et al. ................. | 165/111 X |
| 4,371,028 | 2/1983 | Helshoj ........................... | 165/111 X |

*Primary Examiner*—Albert W. Davis, Jr.
*Attorney, Agent, or Firm*—Laubscher, Philpitt & Laubscher

[57] ABSTRACT

A latent heat accumulator is disclosed including an upright container having, in a major volume first section, a latent heat storage medium, and a passage for a heat exchange medium extending through the charge in the first section. The passage is of the type of a conduit provided with intake openings at different levels. The flow of heat exchange medium through the conduit generates low pressure at the intake openings with the result that a part of the surrounding charge of the heat storage medium is drawn into the conduit for thorough intermixing and heat transfer. The intake openings are preferably protected to prevent large solidified particles of the heat storage medium from blocking the openings or from entering the conduit. The invention improves the heat transfer capacity and reduces the charge of the heat storage medium entering the associated heat exchange circulation system while retaining a relatively simple structure of the accumulator.

12 Claims, 2 Drawing Figures

LATENT HEAT ACCUMULATOR

BACKGROUND OF THE INVENTION

The invention relates to a latent heat accumulator for use with a latent heat storage medium and with a heat exchange medium passing through and immiscible with the heat storage medium and having a specific weight different from, usually smaller than, that of the heat storage medium.

Latent heat accumulators, wherein a heat exchange medium immiscible with the latent heat storage medium is brought into a direct contact with the storage medium by passing through same, to eventually accumulate in a layer within the latent heat accumulator separate from the heat storage medium, have recently become used on an increased scale as heat accumulators with a high accumulation capacity (e.g. U.S. Pat. No. 4,086,958. In such latent heat accumulators, the heat exchange medium is usually charged from a conduit at a lower end of the storage medium batch or charge and then rises freely throughout the heat storage medium. In this fashion, a very intimate heat contact between the heat exchange and the heat storage medium is achieved. On the other hand, difficulties occur when the heat exchange medium passes through solidified regions of the heat storage medium. In such case, retardation of the heat exchange medium flow takes place. Substantial volumes of the heat exchange medium may become blocked within the solidified storage medium. The result is that the boundary layer between the heat storage medium and the heat exchange medium changes and, in an extreme case, the heat storage medium can even become drawn into the circulation of the heat exchange medium, to solidify therein and to give rise to substantial disturbance in operation of the overall system.

In order to avoid the problem, a great volume of heat exchange medium could be used. However, in so doing, the heat storage capacity of the device would be substantially reduced, while still not assuring a continuously distortion free operation.

SUMMARY OF THE INVENTION

It is an object of the invention to provide a latent heat accumulator wherein the likelihood of a retarded passage of the heat storage medium through the heat exchange medium and the occurrence of the blocking of the heat exchange medium in solidified heat storage medium is virtually avoided.

In general terms, the invention provides a latent heat accumulator for use with a latent heat storage medium and with a heat exchange medium immiscible with the heat storage medium and having a specific weight different from, usually smaller than, that of the heat storage medium, comprising, in combination: an upright container having a first section for receiving a charge of the heat storage medium, a second section disposed at a level distinct from that of the first section and arranged to receive a charge of the heat exchange medium; passage means for passing the heat exchange medium through said first section; said passage means including a passage conduit disposed interiorly of the container, extending through said first section and having a discharge opening at one end thereof; said passage conduit comprising intake openings disposed in said first section and arranged to draw a portion of heat storage medium from said first section into said conduit; whereby a mixture of the heat exchange medium and of a portion of the heat storage medium can flow through said passage conduit to be discharged through said discharge opening.

The heat exchange medium is thus guided along a predetermined path extending through the storage medium such that a portion of the heat storage medium is drawn into the passage conduit through the intake openings by underpressure. Inside the passage conduit, an intimate heat exchange contact between the heat exchange medium and the heat storage medium takes place. Furthermore, the heat exchange between the heat exchange medium and the heat storage medium is effected by using only a relatively small portion of the heat storage medium drawn into the conduit. The heat storage medium discharging from the conduit arrives, after the separation from the heat exchange medium, into contact with the remaining heat storage medium whereby a further heat exchange takes place.

It is of advantage when the intake openings are only so large that only small crystals of the solidified heat storage medium can pass through the same. In this way, an essentially liquid heat storage medium arrives at the conduit while small crystal particles which can serve as seed crystals are also contained in such liquid heat exchange medium. On withdrawal of heat a strong undercooling is thus effectively prevented.

In a preferred exemplary embodiment of the invention, it is proposed that the outlet of the conduit be arranged within the batch of heat storage medium. It is particularly advantageous when a deflection surface is arranged in front of the outlet of the conduit, i.e. at a downstream location, which results in that no undesired stirring occurs at the outlet of the conduit. At the same time, a circulation in the heat storage medium is stimulated which advances the intermixing. An infeed for the heat exchange medium can be provided, which is extended into the interior of the conduit as an enclosed channel up to the end of the conduit remote from its outlet; at this end, the flow is then reversed. The intake openings are preferably slots in the conduit wall.

In an advantageous further structure of the invention, it is proposed that in the region of the intake openings deflection surfaces are provided partially overlapping same, which extend in the direction away from the conduit wall, on which the solidified particles formed on discharge of the heat exchange medium can slide.

The solidified particles formed on heat discharge in the heat storage medium normally sink towards the bottom of the latent heat accumulator. Only in particularly exceptional cases, wherein the formed solid particles have a smaller density than the liquid (e.g. ice, water-accumulator) is the direction of movement of the solid particles reverse. In order to prevent the entering of the formed particles during their motion into the intake openings, whereby the same could become blocked, the solidified particle stream is directed away from the conduit by means of the deflection surfaces, so that in the inlet region of the intake openings a substantially liquid storage medium is present. Moreover, these deflecting surfaces have the advantage that the region of the heat storage medium covered by the intake effect is enlarged.

A particularly advantageous arrangement is characterized in that the conduit has a circular cross-section, that the intake openings are of the type of slots or rows of bores disposed at different axial levels and that the deflection surfaces have the shape of a cone jacket.

Preferably, the conduit is built up from conduit sections, at its one end the deflection surface. Each adjacent pair of sections thus forms a slot-shaped intake opening, while the sections are connected to each other.

In a further advantageous embodiment, it is provided that an infeed conduit opening into the heat storage medium, discharges the charged heat exchange medium into the conduit by an annular slot. In such embodiment it is suitable when the infeed reaches down to the bottom area of the latent heat accumulator.

Such an arrangement ensures that even from the lowermost layer of the heat storage medium a part of the flow is drawn so that the entire heat storage medium participates in the heat exchange.

The infeed conduit can carry a funnel on its end open into the heat storage medium.

It is particularly advantageous when a net is arranged at a spacing from the conduit wall. The heat storage medium drawn by the intake openings then flows through the net. This mesh is of size allowing the passage of smaller crystals but not the passage of larger solidified particles of the heat storage medium. The net is disposed at a spacing from the conduit wall whereby the speed at which the drawn heat storage medium passes through the net is reduced thus further reducing the danger of the blocking of intake openings.

It is particularly advantageous, when the net or mesh surrounds the conduit with the conical deflection surfaces concentrically therewith and is held at the free edges of the deflection surfaces.

In a further advantageous embodiment of the invention, a net extending substantially horizontally and disposed above the lowermost intake opening is arranged in the lower region of the latent heat accumulator, the mesh surrounding the conduit and extending over the entire cross-section of the accumulator.

Firstly, this net also contributes to the large size solidified particles not being able to enter the intake openings.

Furthermore, it is possible to achieve a particularly advantageous operation with an incongruently melting heat storage medium. In such an arrangement, the combination of the horizontally extending mesh with a conduit provided with intake openings is extremely suitable. However, the horizontal net at a particular spacing from the bottom surface of the latent heat accumulator can be used advantageously in other structures wherein the heat storage medium is directed by suitable means into a circuit.

The invention will be described in greater detail by way of preferred embodiments, with reference to the accompanying drawings.

DESCRIPTION OF PREFERRED EMBODIMENTS

Figure 1:
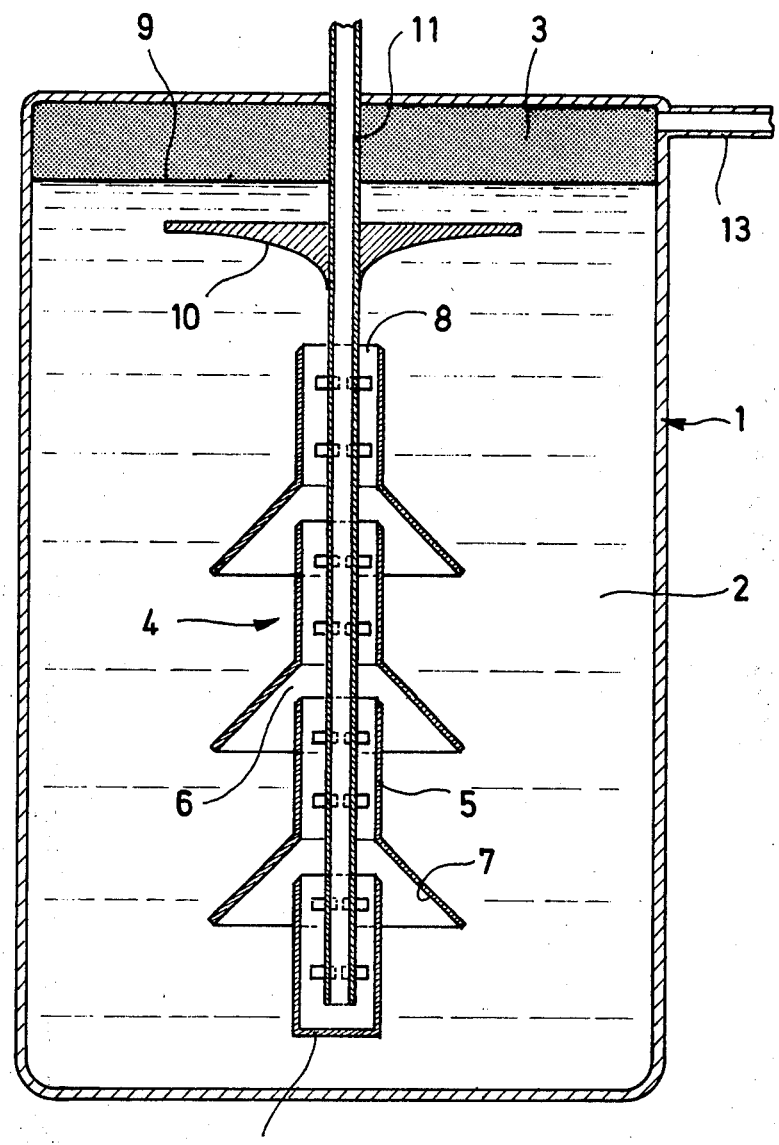
FIG. 1 is a diagrammatic sectional view of a latent heat accumulator with an arrangement according to one embodiment of the present invention.

In FIG. 1 is shown an upright container 1, whose major part, also referred to as "a first or lower section", is filled with a latent heat storage medium 2, for instance with a concentrated Glauber's salt solution. Above the charge of the latent heat storage medium is disposed a layer 3 of a heat exchange medium, for instance a mineral oil. The section filled with the heat exchange medium is also referred to as "a second or upper section".

In the interior of the container is arranged passage means for passing the heat exchange medium through the first section, the passage means including a vertically directed passage conduit 4, which is composed of a plurality of tubular sections 5, wherein each adjacent pair of tubular sections 5 is maintained at a spacing, so that in the transfer region between the tubular sections are formed circular slots 6 in the wall of the conduit 4. With the exception of the lowermost tubular section, each tubular section carries at its lower end a downwardly divergent, funnel shaped or cone jacket shaped deflection member 7 which at least partly overlaps the respective slot.

The uppermost tubular section ends at an outlet 8 disposed underneath the boundary layer 9 between the heat storage medium and the heat exchange medium in the interior of the container and within the first section. In front of the outlet 8 is arranged a deflection surface 10, which can simply be of the shape of a plate disposed perpendicularly to the elongation of the conduit 4, but, in a more preferred embodiment, is provided (FIG. 1) by a contour deflecting the mixture discharged from the conduit into the horizontal direction. Suitably, the deflection contour is so formed that the deflection of the flow discharged from the outlet is effected symmetrically about the axis of the conduit in all directions substantially radially away from the conduit axis.

In a first exemplary embodiment shown in FIG. 1, a tube 11 is fixedly secured centrally of the conduit 4 which reaches down to the end 12 of the conduit opposite to the outlet 8 and opens downwardly into a closed end 12 of the conduit 4. This tube 11 serves the purpose of infeed of the heat exchange medium which reverses its direction at the closed end 12 and flows upwardly through the conduit 4. In the process, heat storage medium from the surroundings is drawn through the slots 6. The drawing suction effect reaches relatively widely into the heat storage medium batch due to the cone jacket shaped intake shield means of the type of frustoconical shields or deflection surfaces 7. In the interior of the conduit 4, a relatively intimate intermixing of the heat exchange medium with the heat storage medium takes place, whereby heat exchange is effected. The heat exchange medium intermixed with the heat storage medium enters through the outlet 8 still in the first section into the heat storage medium charge and is deflected horizontally and radially away by the deflection surface 10. Thus, the heat storage medium is circulated throughout the entire first section of the container, while the heat exchange medium separates from the deflected horizontal stream and flows to the second section above the heat storage medium, in the layer 3, from which it can be directed by means of a pipe 13 into an exterior circuit in which it transfers or receives heat, depending on application. Eventually, the oil reaches through the pipe 11 again the conduit 4 and the outlined process is repeated.

The individual tube sections are connected with each other by means not shown in the drawing. For instance, this can be effected by means of horizontal rods secured, at their one end, to the deflection surface 7 and, at the other, to the walls of the underneath tubular piece. In this way, the intake of the heat storage medium is not restricted by the connection.

In the shown arrangement, the cross-sections of the heat exchange medium inlets into the tube and the cross-section of the tube are so adjusted relative to each other that a lower pressure can be generated in the interior of the tuba which secures the intake of the heat storage medium through the intake openings or slots in the wall of the conduit. The size of the slots in the tube wall is preferably so selected that in a normal operation only small crystals of the heat storage medium can pass through the same while large solidified particles cannot enter.

In the modified embodiment, the openings in the tubular walls can be also of the type of bores disposed in annular or helical rows in the wall of the conduit 4 which is then continuous as opposed to the interrupted structure with slots.

In this structure, it is also possible to surround the intake openings with conical jacket shaped deflection surfaces as is the case in the embodiment shown in FIG. 1. The deflection surfaces prevent the settling solidified particles in the heat storage medium from reaching immediate proximity of the intake openings to block them. By the deflection surfaces, which direct the solidified particles away from the conduit wall, it is achieved that virtually only the liquid fraction of the heat storage medium containing only small seed crystals is drawn into the intake openings. This is desirable as the density of seed crystals in the heat storage medium is increased so that undesired undercooling is prevented to a substantial degree.

Figure 2:
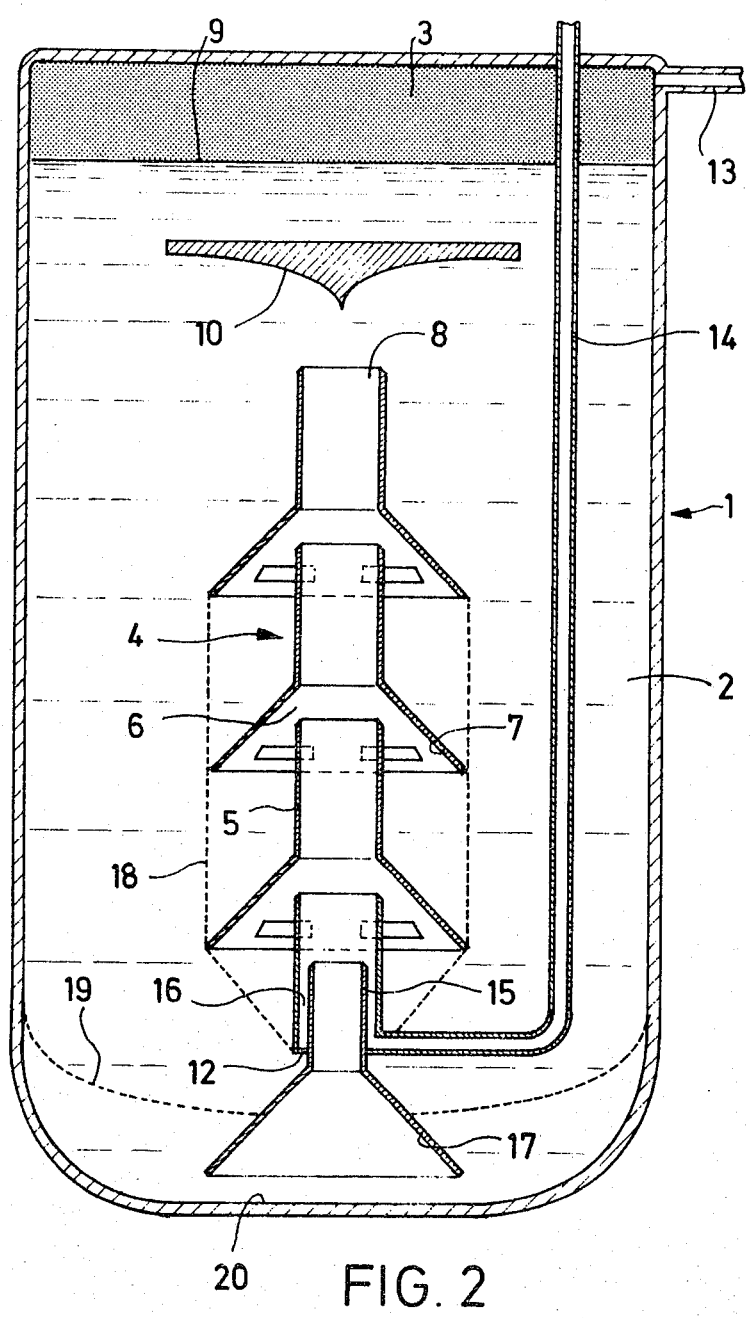
FIG. 2 is a view similar to FIG. 1 of a further preferred embodiment of a latent heat accumulator according to the invention.

The embodiment shown in FIG. 2 of a latent heat accumulator is to a substantial degree built similar to that of FIG. 1; the same parts are designated with the same reference materials.

Contrary to the embodiment of FIG. 1, in the second embodiment the heat exchange medium is not charged through a pipe extending centrally inside the contact, but by a pipe 14 disposed exteriorly of the conduit, which discharges sidewise into the conduit 4 at its closed end. Furthermore, the closed pipe end 12 of the conduit 4 is provided with an opening through which a further pipe element 15 is inserted, whose diameter is smaller than the diameter of the lowermost tubular section of the conduit 4. In this manner, an annular slot 16 is formed between the tubular sections 15 and the lowermost tubular section of the conduit 4, into which flows the heat exchange medium discharged from the tube 14.

The tubular section 15 carries at its lower end, similarly as in the other tubular sections, a deflection surface widening in a funnel shaped fashion.

This arrangement, wherein the heat exchange medium is directed through the annular slot 16, makes it possible to effectively draw the heat storage medium even at the lower end of the conduit 4 whereby the heat exchange medium is thoroughly intermixed with the heat storage medium at the lower part of the conduit 4.

A futher improvement of the operation of the latent heat accumulator according to the invention can be achieved such that the conduit 4 is surrounded by a grid or net 18. In the embodiment shown in FIG. 2, is shown, for instance, a net 18, which is secured at the free end of the cone jacket shaped deflection surfaces 7 and which surrounds in cylindrical fashion the conduit 4. In the lower region, the net 18 is so directed to the conduit 4 or to the tubular section 15 that all intake openings are covered with respect to the surrounding heat storage medium.

The mesh of the net 18 is so dimensioned that only small crystals of the heat storage medium can pass through same while larger solidified particles are held back. By such arrangement, the slots 6 serving as intake openings can be dimensioned in greater size while no large particles of the storage medium can reach the conduit 4. It is further advantageous that the net disposed at a spacing from the intake openings results in that the heat storage medium directed to an intake opening is drawn through the net over an area which is substantially greater than the area of the intake opening itself. Thus, the heat storage medium passes through the net at a relatively low velocity. This effect, too, contributes to the large size crystals being prevented from blocking the intake openings and mesh openings.

In a further advantageous improvement a sieve or net 19 is provided extending substantially horizontally over substantially the entire cross-section of the container 1, and disposed at a level near the bottom 20 of the container, while at least the lowermost intake opening is disposed underneath the net 19. The mesh size of such net is so dimensioned that the crystals formed on the cooling of the heat storage medium above the net are held back. Thus, the lowermost intake opening draws from underneath the net 19 the liquid heat storage medium which passed through the solidified particle layer disposed on the net. Thus, even in the solidified particle layer a full temperature exchange takes place.

The use of such a sieve is particularly advantageous with incongruently melting heat storage medium, for instance with a Glauber's salt solution. A part of sodium sulfate precipitates in the form of anhydride on the temperature drop of the heat storage medium, while a further part of the hydrated sodium sulfate is solid. The hydrated sodium sulfate is caught by the net 19, the anhydride falls through same and accumulates at the bottom of the container. The precipitation of the anhydride gives rise to the depletion of the solution in sodium sulfate.

Due to the fact that now a liquid solution is drawn through the crystal layer on the net 19 into the lowermost layer, the depleted liquid enters into intimate bond with the anhydride. In the process, a part of the anhydride can be further removed from the depleted solution, that is, returned back into the circulation. Besides, a temperature equilibrium over substantially the entire height of the container will be achieved. This is of an extraordinary significance with incongruently melting storage media since the transformation into the solid phase of such storage medium does not occur at a predetermined temperature but on drop of the temperature by a certain degree, so that the first formed solidified particles have a higher temperature than those solidified particles which are formed during the subsequent drop at a later stage.

The transformation of the storage medium is preferably achieved within the framework of the device of the present invention by a directed flow of the heat exchange medium through the heat storage medium, wherein parts of the heat storage medium are drawn and carried along by the heat exchange medium. This solution is extraordinarily advantageous, on the one hand, in view of the good heat exchange and also due to free separation of the heat exchange medium from the heat storage medium.

As has been shown, this arrangement is also particularly advantageous in view of homogenization of the storage medium temperature and in view of the further release of the anhydride in non-congruently melting storage substances. In the latter case, the transformation of the storage medium by the assistance of the heat storage medium is a particularly advantageous method for the changeover, however, other methods can basically be used also to convey the liquid heat exchange medium through a crystal layer supported by a net above the latent heat accumulator bottom into a bottom layer from anhydride.

Those skilled in the art will readily appreciate that further embodiments of the present invention may be provided which depart from the above description without departing from the scope of the accompanying claims.

We claim:

1. A latent heat accumulator for use with a latent heat storage medium and a heat exchange medium immiscible with and having a specific weight less than that of said heat storage medium, comprising
   (a) a vertically arranged container (1) having a lower section containing a volume of said heat storage medium and an upper section containing a volume of said heat exchange medium; and
   (b) means for transporting said heat exchange medium through said heat storage medium for mixture therewith, said transport means including
      (1) a passage conduit (4) vertically arranged within said container lower section, the upper end of said passage conduit being spaced from said upper section and containing an outlet opening (8), said conduit also containing a plurality of vertically spaced radially arranged inlet openings (6) through which said heat storage medium may enter said conduit; and
      (2) means (11, 14) for introducing said heat exchange medium into the lower end of said conduit for upward flow therethrough, whereby when said heat exchange medium flows upwardly through said conduit toward said outlet opening, said heat storage medium is drawn into said conduit via said inlet openings for mixing in heat exchange relation with said heat exchange medium, following which the mixture is discharged from said conduit via said outlet opening.

2. Apparatus as defined in claim 1, and further comprising deflector means (10) arranged within said container lower section above said outlet opening for horizontally deflecting said mixture from said outlet opening.

3. Apparatus as defined in claim 1, wherein said means for introducing said heat exchange medium into said conduit comprises a vertical pipe (11) centrally arranged within said conduit, the lower end of said conduit being closed for deflecting said heat exchange medium upwardly through said conduit through an annular passage defined between the walls of said pipe and said conduit.

4. Apparatus as defined in claim 1, wherein said inlet openings comprise slots.

5. Apparatus as defined in claim 1, and further comprising inlet shield means (7) arranged adjacent said inlet openings for partially shielding the same, said inlet shield means extending radially away from said conduit wall for deflecting solid particles of said heat storage medium flowing through said lower section in a direction away from said upper section and substantially radially away from said inlet openings.

6. Apparatus as defined in claim 5, wherein said shield means have a frustoconical configuration and are coaxially arranged with said passage conduit, said shield means further being divergent in the direction away from said container upper section.

7. Apparatus as defined in claim 6, wherein said passage conduit comprises a plurality of aligned conduit sections each having a shield at the lower end thereof, said sections being connected in spaced relation to define said inlet openings.

8. Apparatus as defined in claim 1, wherein said conduit includes means defining an annular passage (16) at the lower end thereof, and further wherein said means for introducing said heat exchange medium into said conduit comprises a vertical pipe (14) having a lower outlet opening which communicates with said conduit annular passage.

9. Apparatus as defined in claim 8, wherein said conduit includes a vertically arranged tubular pipe element (15) extending through the lower surface thereof, the upper portion of said pipe element defining the inner wall of said annular passage and the lower portion of said pipe element extending toward the bottom of said container lower section.

10. Apparatus as defined in claim 9, wherein said tubular pipe element includes a downwardly divergent funnel (17) connected with the lower end thereof.

11. Apparatus as defined in claim 1, and futher comprising net means (18) surrounding said passage conduit in a spaced concentric relation thereto, a portion of said net being connected with the free edge portions of said inlet shield means, whereby said heat storage medium passes through said net when drawn through said inlet openings into said conduit.

12. Apparatus as defined in claim 2, and further comprising a horizontally arranged net (19) extending over the cross-sectional area of said container to divide said container lower section into upper and lower subsections, said net containing an opening communicating with the lowermost inlet opening of said conduit, thereby to provide direct communication between said container lower subsection and said lowermost inlet opening.

* * * * *